United States Patent
Murdock et al.

(10) Patent No.: US 10,990,753 B2
(45) Date of Patent: Apr. 27, 2021

(54) SYSTEMS AND METHODS FOR A PROCEDURAL SYSTEM FOR EMERGENT NARRATIVE CONSTRUCTION

(71) Applicant: DISNEY ENTERPRISES, INC., Burbank, CA (US)

(72) Inventors: Malcolm E. Murdock, Burbank, CA (US); Mohammad Poswal, Burbank, CA (US); Taylor Hellam, Burbank, CA (US); Dario Di Zanni, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 817 days.

(21) Appl. No.: 15/353,455

(22) Filed: Nov. 16, 2016

(65) Prior Publication Data

US 2018/0137092 A1 May 17, 2018

(51) Int. Cl.
 *G06F 40/18* (2020.01)
 *G06F 40/186* (2020.01)
 *G06F 40/30* (2020.01)

(52) U.S. Cl.
 CPC ............ *G06F 40/186* (2020.01); *G06F 40/30* (2020.01)

(58) Field of Classification Search
 CPC .. G06F 17/248; G06F 17/2785; G06F 40/186; G06F 40/30
 See application file for complete search history.

(56) References Cited

U.S. PATENT DOCUMENTS

| | | | |
|---|---|---|---|
| 8,613,646 B2 * | 12/2013 | Rogers | G06Q 10/00 463/1 |
| 8,649,803 B1 | 2/2014 | Hamill | |
| 8,880,629 B1 | 11/2014 | Henrick | |
| 9,082,092 B1 * | 7/2015 | Henry | G06Q 10/06 |
| 9,165,170 B1 | 10/2015 | Gutnik | |
| 9,304,652 B1 * | 4/2016 | Lundin | G06F 3/04815 |
| 9,392,212 B1 * | 7/2016 | Ross | H04N 5/9305 |
| 9,613,179 B1 | 4/2017 | Schultz | |
| 10,185,477 B1 * | 1/2019 | Paley | G06F 3/0482 |
| 2004/0229685 A1 * | 11/2004 | Smith | A63F 13/65 463/29 |
| 2005/0239549 A1 | 10/2005 | Salvatore | |
| 2008/0300053 A1 | 12/2008 | Muller | |
| 2009/0132967 A1 | 5/2009 | Wong | |
| 2010/0161541 A1 | 6/2010 | Covannon | |
| 2011/0246182 A1 * | 10/2011 | Allen | G06F 17/248 704/9 |
| 2011/0314381 A1 * | 12/2011 | Fuller | G06F 3/017 715/727 |
| 2012/0270615 A1 | 10/2012 | Jones | |

(Continued)

*Primary Examiner* — Alexey Shmatov
*Assistant Examiner* — Tri T Nguyen
(74) *Attorney, Agent, or Firm* — Esplin & Associates, PC

(57) ABSTRACT

A user interface may be presented to a creator to facilitate the creation of narrative content. The user interface may be part of a system configured to generate recommendations pertaining to narrative content. The narrative content is meant to be experienced by users, e.g., in a virtual space. Feedback and/or other responses from the creator may be used to train and/or modify the generation of new recommendations. Feedback and/or other responses from the users may be used to train and/or modify the generation of new recommendations.

26 Claims, 3 Drawing Sheets narrative feature types character type → [1]

action type → [2]

object type → [3]

other types → [i...]

narrative feature type libraries character types → a mouse [1], a soldier [2], a thief [3], ...

action types → buy [1], chase [2], steal [3], ...

object types → a hat [1], a thief [2], ...

other types → "x" [1], "y" [2], "z" [3], ...

(56) References Cited

U.S. PATENT DOCUMENTS

| | | | |
|---|---|---|---|
| 2012/0309515 A1* | 12/2012 | Chung | A63F 13/00 463/31 |
| 2014/0031114 A1 | 1/2014 | Davison | |
| 2014/0274403 A1* | 9/2014 | Anastasopoulos | A63F 13/795 463/42 |
| 2014/0282013 A1 | 9/2014 | Amijee | |
| 2014/0354690 A1 | 12/2014 | Walters | |
| 2015/0030305 A1 | 1/2015 | Moon | |
| 2016/0293133 A1* | 10/2016 | Dutt | G06F 8/20 |
| 2017/0339089 A1* | 11/2017 | Longdale | H04L 51/18 |

* cited by examiner

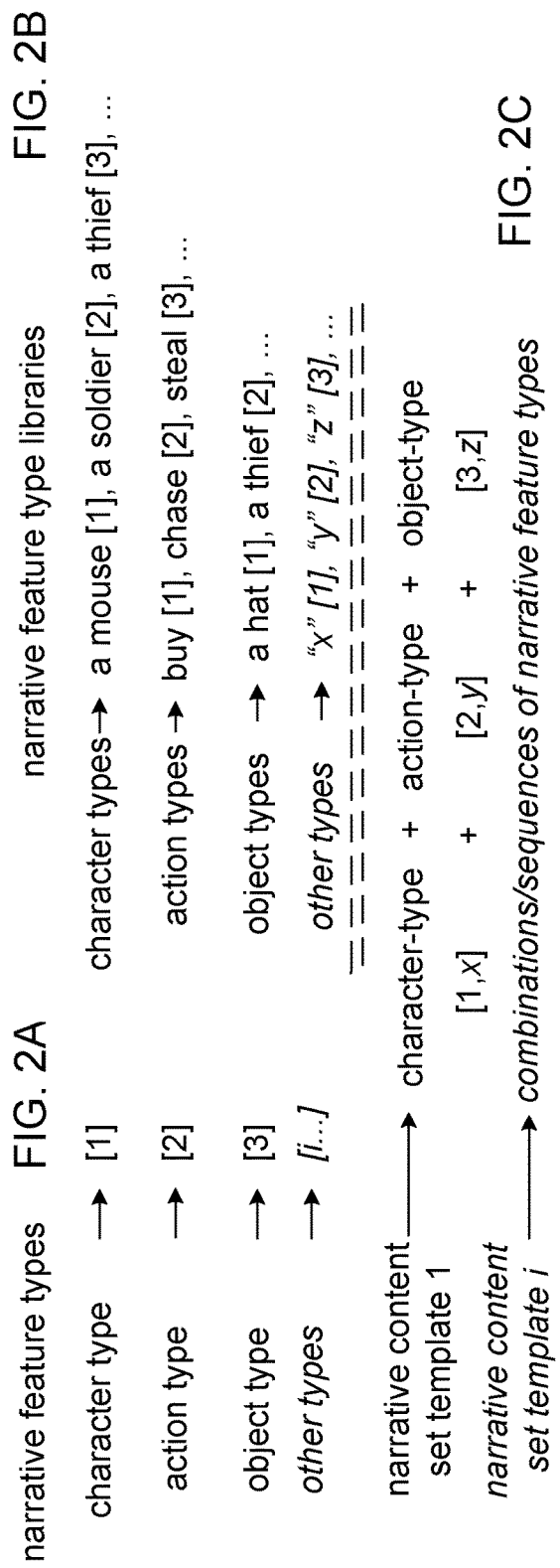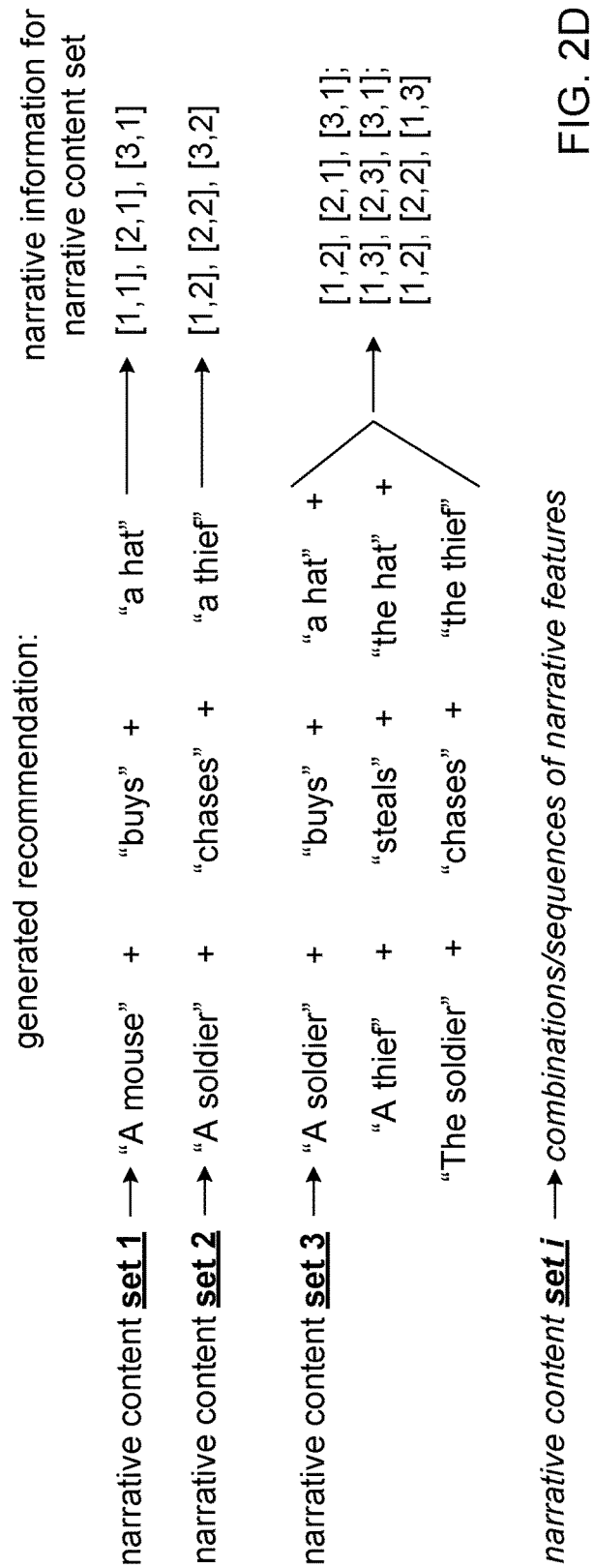

SYSTEMS AND METHODS FOR A PROCEDURAL SYSTEM FOR EMERGENT NARRATIVE CONSTRUCTION

FIELD OF THE DISCLOSURE

This disclosure relates to generating recommendations pertaining to narrative content, in particular interactive narrative content to be generated in a virtual space.

BACKGROUND

Providing interactive narrative content in a virtual space presents complex challenges. In particular, for "open world"-type virtual spaces, a large volume of narrative material is needed to support rich and meaningful user interaction. Fully manual processes are prohibitively time-consuming, labor-intensive, and expensive. Authoring complexity may scale dramatically with many interacting characters and longer narratives.

SUMMARY

One aspect of the disclosure relates to a system configured to generate recommendations pertaining to narrative content to be generated in a virtual space and/or experienced by one or more users, e.g., in a virtual space and/or through other media suitable for content delivery. The system may be used by writers, creators, and/or other types of users jointly referred to as creative users. The users that experience the narrative content, e.g., in a virtual space or through other media, may be referred to as users, players, online users, online players, interactive users, and/or connected users.

Narrative content may be organized as narrative content sets having narrative features. A narrative content set may form the basis for a narrative experience to be generated in a virtual space. In some implementations, a narrative content set may include an ordered set of narrative features. In some implementations, narrative features may be associated with one or more narrative feature types. Narrative feature types may include, by way of non-limiting example, one or more of a character type, an environment type, an object type, a plot point type, a character development type, an action type, an objective type, and/or other types. Narrative features and/or narrative feature types may be ordered and/or otherwise combined. In some implementations, narrative information may be used to specify narrative features of narrative content sets.

In some implementations, the system may include electronic storage and one or more physical processors that are configured by machine-readable instructions. The electronic storage may be configured to store electronic information, and/or electronically storage information, including but not limited to narrative information. Executing the machine-readable instructions may cause the one or more physical processors to facilitate generating recommendations pertaining to narrative content to be generated in a virtual space. The machine-readable instructions may include one or more of a storage component, a virtual space component, a response component, a generation component, a presentation component, an access component, a load component, a comparison component, and/or other components.

The storage component may be configured to access and/or store electronic information, including but not limited to accessing and/or storing electronic information in the electronic storage. The electronic information may include narrative information. The narrative information may be used to specify narrative features of narrative content sets. Narrative content sets may form bases for narrative experiences. The narrative features may be associated with narrative feature types, including but not limited to a character type, an environment type, an object type, a plot point type, a character development type, an action type, an objective type, and/or other narrative feature types.

The virtual space component may be configured to implement one or more instances of the virtual space executed by machine-readable instructions to determine views of the virtual space. An instance of the virtual space may be based on and/or otherwise present a narrative experience to one or more users. In some implementations where the virtual space may be hosted by server(s), the views may then be communicated (e.g., via streaming, via object/position data, and/or other information) from server(s) to computing platforms for presentation to users. The view determined and presented to a given user may correspond to a game entity being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may include a simulated space that is accessible by one or more users via computing platforms that present the views of the virtual space to the one or more users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by the virtual space component is not intended to be limiting. The virtual space component may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by the virtual space component, users may control game entities, objects, simulated physical phenomena (e.g., wind, rain, earthquakes, and/or other phenomena), and/or other elements within the virtual space to interact with the virtual space and/or each other. One or more user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

Virtual items may include one or more of a virtual weapon, a tool, a food, a currency, a reward, a bonus, health, a portion, an enhancement, a mount, a power-up, a speed-up, clothing, a vehicle, an anatomical feature of a game entity, a troop or troop type, a pet, a virtual resource, and/or other virtual items and/or goods.

The users may participate in the instance of the virtual space by controlling one or more of the available user controlled elements in the virtual space. Control may be exercised through control inputs and/or commands input by the users through computing platform(s). The users may interact with each other through communications exchanged within the virtual space. Such communications may include one or more of textual chat, instant messages, private messages, voice communications, and/or other communications. Communications may be received and entered by the users via their respective computing platform(s). Communications may be routed to and from the appropriate users through server(s).

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, individual game entities may be defined by attribute values of one or more game entity attributes, and/or other information. In some implementations, attribute values of one or more game entity attributes may include one or both of default attribute values, values defined based on gameplay, and/or other attribute values.

The response component may be configured to gather and/or aggregate user information that conveys user responses to narrative experiences by one or more users. In some implementations, user responses may be related to popularity, duration of time spent, virtual credit spent, credit spent, earnings by advertisers, and/or other measures of user engagement. In some implementations, user feedback from users may be used to determine user responses.

For example, the response component may be configured to determine which particular narrative feature from a set of narrative features having the same or similar narrative feature type garnered the most favorable user response. For example, narrative experiences involving a particular mouse may be more popular than narrative experiences involving a particular duck. For example, narrative experiences involving a particular swamp environment may be more popular than narrative experiences involving a particular desert planet. For example, narrative experiences involving a particular ring may be more popular than narrative experiences involving a particular necklace. For example, narrative experiences involving a particular type of quest may be more popular than narrative experiences involving a particular type of chase. In some implementations, the response component may operate on combinations and/or sets of narrative features. More elaborate results regarding user responses may be determined, including, by way of non-limiting example, that narrative experiences involving a mouse losing a ring may be more popular than narrative experiences involving a duck buying a necklace, or that a combination of a dog chasing a treasure followed by the dog losing the treasure may be more popular than the combination of a dog losing a treasure followed by the dog chasing the treasure.

The generation component may be configured to generate recommendations for narrative content sets that form bases for narrative experiences. A narrative content set may include a set of narrative features. Generation of recommendations may be based on user information, in particular as aggregated by the response component.

The presentation component may be configured to effectuate presentations of recommendations to creative users. In particular, the presentation component may be configured to effectuate presentations of recommendations via user interfaces on computing platforms. In some implementations, user interfaces may be configured to obtain user input from creative users, including but not limited to user input related to feedback from creative users, selection of one or more narrative features, and/or other information pertaining to recommendations and/or narrative experiences.

The access component may be configured to obtain information from the electronic storage. For example, the access component may be configured to obtain narrative information from the electronic storage. Obtained information may be used, e.g., by other components of the system, to facilitate the generation of recommendations for narrative content sets that form bases for narrative experiences.

The load component may be configured to obtain implementations of narrative experiences suitable for presentation to users in the virtual space. In some implementations, the load component may obtain implementations from the virtual space component. The narrative experiences may be based on narrative content sets and/or recommendations for narrative content sets that form bases for narrative experiences in a virtual space.

The comparison component may be configured to compare user information that conveys user responses to one or more narrative experiences in the virtual space. For example, the comparison component may be configured to compare two sets of user information conveying users responses to two narrative experiences, respectively.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 2A-2B-2C-2D illustrate examples of narrative information forming a basis for a narrative experience.

DETAILED DESCRIPTION

Figure 1:
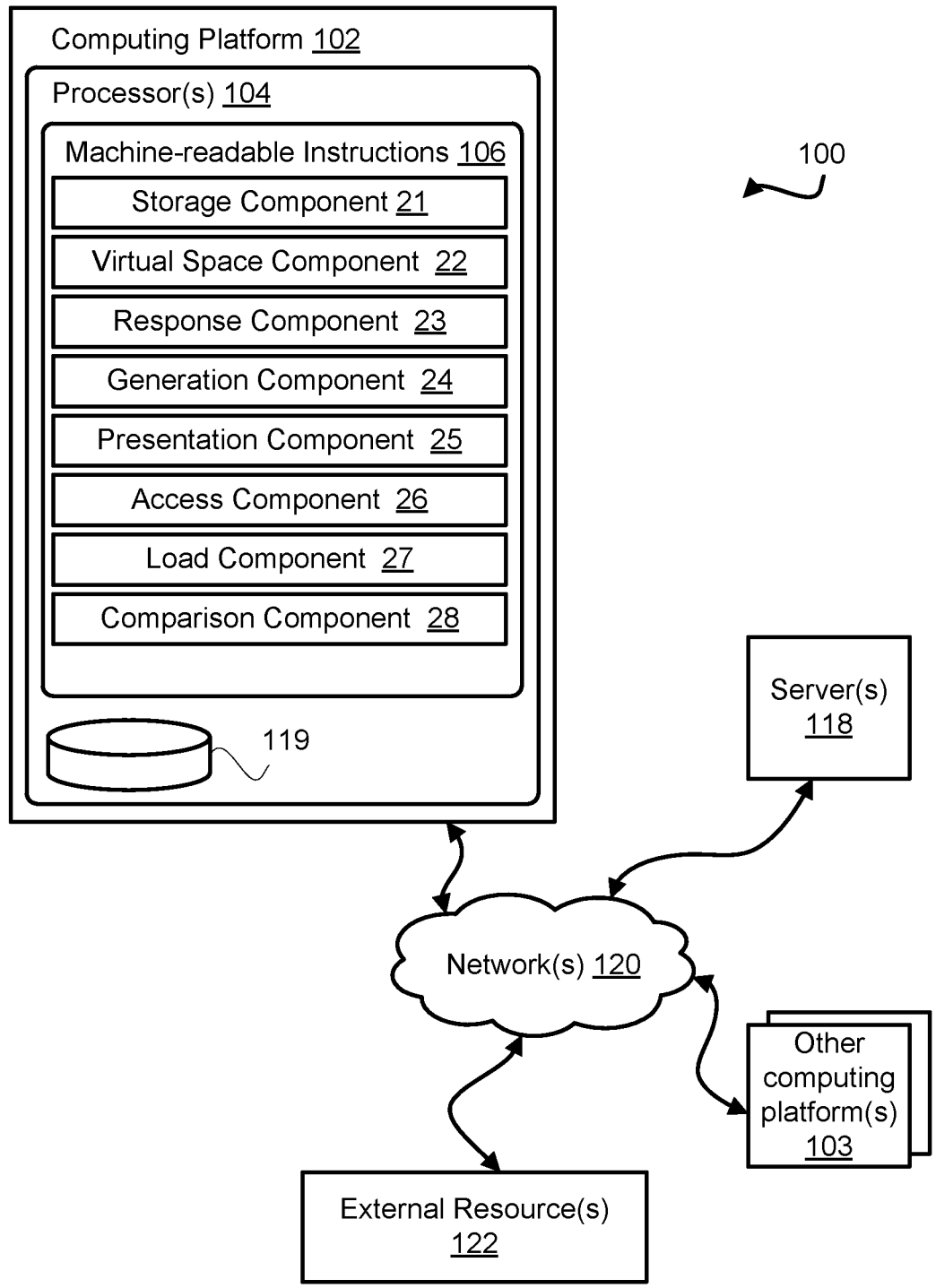
FIG. 1 illustrates a system configured to generate recommendations pertaining to narrative content to be experienced by one or more users in a virtual space, in accordance with one or more implementations.

FIG. 1 illustrates a system 100 configured to generate recommendations for one or more creative users. The recommendations may pertain to narrative content to be generated in a virtual space. An instance of a virtual space may include a simulated space that is accessible by users through computing platforms that present view of the virtual space to the users.

In some implementations, the one or more users in the virtual space may be different from the one or more creative users. Users may interact with objects within the instance of the virtual space, for example by controlling the position and/or activity of objects. For example, narrative content may include characters performing actions to achieve objectives, similar to adventures or stories. For example, a band of pirates may search for a legendary treasure. Narrative content generated in a particular virtual space may include characters within the particular virtual space performing actions to achieve objectives within the particular virtual space. For example, a band of pirates within the environment of a particular virtual space representing The Caribbean of the early 18$^{th}$ century may be searching for a legendary treasure. Narrative content generated within the particular virtual space may be as simple as a single character performing a single action, or as complicated as a series of episodic adventures of a large set of interacting characters spanning decades.

In some implementations, the system 100 may include a computing platform 102, one or more networks 120, one or more servers 118, one or more other computing platforms 103, one or more external resources 122, and/or other components. One or more networks 120 may include virtual private networks, private networks, public networks, the internet, and/or combinations thereof. Computing platform 102 may include electronic storage 119 and one or more physical processors 104 configured by machine-readable instructions 106 to generate recommendations.

The machine-readable instructions 106 may include one or more of a storage component 21, a virtual space component 22, a response component 23, a generation component 24, a presentation component 25, an access component 26, a load component 27, a comparison component 28, and/or other components. Other computing platforms 103, servers 118, and/or external resources 112 may include computer processors similar to physical processors 104, storage media similar to electronic storage 119, and/or machine-readable instructions similar to machine-readable instructions 106. In some implementations, components of computing platform 102 and/or system 100 may be located in other locations than depicted in FIG. 1. In some implementations, one or more features of a component of system 100 may be performed and/or otherwise supported in other locations than depicted in FIG. 1.

In some implementations, server 118 may be configured to provide remote hosting of the features and/or function of the machine-readable instructions 106 to one or more computing platforms 102 that may be remotely located from the server 118. In some implementations, one or more features and/or functions of server 118 may be attributed as local features and/or functions of one or more computing platforms 102. The computing platforms 102 may include client computing platforms, including but not limited to one or more of a cellular telephone, a smartphone, a laptop, a tablet computer, a desktop computer, a television set-top box, smart TV, a gaming console, and/or other client computing platforms.

In FIG. 1, electronic storage 119 may be used to store information electronically, including but not limited to narrative information. Narrative information may be used to specify narrative features of narrative content sets. A narrative content set may form the basis for a narrative experience to be generated in a virtual space and/or experienced by one or more users, e.g., in a virtual space and/or through other media suitable for content delivery. In some implementations, a narrative content set may include an ordered set of narrative features. In some implementations, narrative features may be associated with one or more narrative feature types. Narrative feature types may include, by way of non-limiting example, one or more of a character type, an environment type, an object type, a plot point type, a character development type, an action type, an objective type, and/or other types. Narrative features and/or narrative feature types may be ordered and/or otherwise combined. In some implementations, a character may be referred to as an actor. In some implementations, narrative features may be controlled and/or otherwise dependent on parameters and/or attributes. For example, a character or actor may be controlled by and/or dependent upon character parameters or actor parameters. Objects may be controlled by and/or dependent upon object parameters and/or object attributes, and so forth.

By way of non-limiting example, FIG. 2A illustrates an example of different narrative feature types, in this case "character type," "action type," "object type," and other types FIG. 2A illustrates how narrative feature types may be encoded and/or described as narrative information (e.g. to facilitate storage in electronic storage 119 and/or processing through machine-readable instructions by components of system 100). For example, as depicted, character type may be encoded with "1," action type with "2," object type with "3," and other types with another encoding "i," such as numbers greater than 3.

An actor may include an entity within a narrative experience having one or more roles within the virtual space. An actor may be of a type including one or more of a primary actor type (e.g., playing a lead role in a narrative experience), a secondary actor type (e.g., playing a supporting role in a narrative experience), an ambient actor type (e.g., playing a background role in a narrative experience), and/or other types of actors. In some implementations, an actor may be represented by one or more of a human form (e.g., a human male or female), an animal form (e.g., a dog, a cat, a bear, and/or other animal form), a futuristic form (e.g., a robot, an alien, and/or other futuristic form), and/or other representations, including combinations of multiple forms.

It is noted that the above descriptions are provided for illustrative purposes only and is not to be considered limiting. For example, in other implementations, actors may embody other roles within a narrative experience.

By way of non-limiting example, FIG. 2B illustrates an example of a set of different narrative feature types, organized in narrative feature type libraries. In this case the narrative feature type libraries for "character types," "action types," "object types," and "other types" are depicted. FIG. 2B illustrates how narrative feature types may be encoded and/or described as narrative information (e.g. to facilitate storage in electronic storage 119 and/or processing through machine-readable instructions by components of system 100). For example, as depicted, character types may include "a mouse," "a soldier," and "a thief," as well as additional character types that are not further specified or depicted other than by ellipses. These character types may be encoded with "1," "2," "3," respectively. For example, as depicted, action types may include "buy," "chase," and "steal," as well as additional action types that are not further specified or depicted other than by ellipses. These action types may be encoded with "1," "2," "3," respectively. For example, as depicted, object types may include "a hat" and "a thief," as well as additional object types that are not further specified or depicted other than by ellipses. These object types may be encoded with "1" and "2," respectively. For example, other types may include type descriptors "x," "y," and "z," respectively, which are not further specified in this disclosure. These other types may be encoded with "1," "2," "3," respectively.

An object may include an entity within a narrative experience that may interact with actors, other objects, may be stationary, moveable, and/or configured in other ways. By way of non-limiting example, an object may include an entity that may be usable by an actor to perform one or more tasks. In some implementations, an object may include a stationary and/or moveable object that may be positioned within an environment as part of the scenery of the environment. By way of non-limiting example, an object may include one or more of a tool, a weapon, an item of clothing, a currency, a vehicle, a topographical element, and/or other objects. A tool may include one or more of a key, a wrench, and/or other tools. A weapon may include one or more of a gun, a knife, bat, and/or other weapons. An item of clothing may include one or more of a shirt, pants, shoes, a hat, a uniform, and/or other items of clothing. A vehicle may include one or more of a car, an airplane, a skateboard, a motorcycle, and/or other vehicles.

It is noted that the above description of objects and/or use of objects by actors within a narrative experience is provided for illustrative purposes only and is not to be considered limiting. For example, in other implementations, objects may embody other types of objects and/or may provide other roles within a narrative experience.

An environment may include an ambient environment in a narrative experience may take place. An environment may include a simulated space in which actors and/or objects may move about. By way of non-limiting example, an environment may include one or more of an indoor space (e.g., a building, a vehicle, and/or other indoor space), an outdoor space (e.g., a park, a city block, and/or other outdoor space), and/or other environments. In some implementations, environments may include a particular geographical location (e.g. a particular country, a desert, etc.), a particular time-period (e.g. Wild West, Middle Ages, etc.), and/or other environments, as well as combinations thereof. In some implementations, environments may include one or more objects disposed within the environment. By way of non-limiting example, an environment may include an office building. The office building may be populated with objects.

It is noted that the above description of environment within a narrative experience is provided for illustrative purposes only and is not to be considered limiting. For example, in other implementations, environments may embody other types of environments, as well as combinations of multiple environments.

Actor parameters may be associated with actors and/or other components. Values of actor parameters may define actors and/or other components. Actor parameters may include one or more of an appearance parameter, an abilities parameter, an inventory parameter, a location parameter, and/or other parameters.

Values of an abilities parameter of an actor may specify types of actions and/or tasks the actor may be configured to execute in a narrative experience and/or other information. In some implementations, values of an abilities parameter may specify one or more of abilities of an actor to interact with and/or manipulate objects and/or other actors, sequences of movement the actor may perform in order to complete a task and/or action, skills the actor may have, sounds (e.g., words, sentences, and/or other sounds) the actor may make, manners in which an actor may interact with other actors and/or objects, and/or other information related to actors' abilities within a narrative experience. For example, a first value of a first abilities parameter may specify that a first actor may be configured to perform a first task. The first task may include manipulation of a first object in accordance with a first sequence of movements by the first actor.

By way of non-limiting illustration, one or more values of an abilities parameter for a given actor may specify one or more of an ability to interact with a vehicle object to drive the vehicle object, a sequence of movements the actor may perform to interact with the vehicle object, and/or other information. For example, a sequence of movements may specify that to drive a car, an actor (e.g., of a human form and/or other forms) may move to a proximity of a vehicle, raise their arm so that their hand contacts a door handle of the vehicle, retract their arm to pull the handle to open the door, enter the vehicle, move into a seated position, grab the steering wheel, and/or other movements.

By way of non-limiting illustration, one or more values of an abilities parameter for a given actor may specify that an actor may make a sound (e.g., say a greeting) when the actor encounters another actor, and/or other perform other actions.

Values of an inventory parameter of an actor may specify one or more objects that may be included with the actor and/or may be otherwise provided to the actor. For example, one or more values of an inventory parameter of a first actor may specify that the first actor is provided with a first object. By way of non-limiting illustration, a first value of a first inventory parameter may specify that an actor may have a futuristic weapon.

Values of a location parameter of an actor may specify one or more of locations of an actor, movements the actor may perform throughout a narrative experience, and/or other information. By way of non-limiting example, one or more values of one or more location parameters may specify one or more of a starting location of an actor at the start of a narrative experience, an ending location of the actor at the end of the narrative experience, a current location of the actor, sequences of movement the actor may perform to position themselves in one or more locations, and/or other information. By way of non-limiting example, a first value of a location parameter of a first actor may specify a first location of the first actor at the start of a narrative experience. By way of non-limiting illustration, one or more values of a location parameter of a background role actor may specify one or more of a starting location, and ending location, and/or movement the background role actor may take to traverse from the starting location to the ending location. By way of further non-limiting illustration, within a bank environment, a background role actor may be a customer, and the customer may enter the bank and walk to a teller to stand in line.

Object parameters may be associated with objects and/or other components. Values of object parameters may define objects and/or other components portrayed in a narrative experience. Object parameters may include one or more of an appearance parameter, an affordances parameter, an abilities parameter, a location parameter, and/or other parameters.

Values of an appearance parameter of an object may specify a visual appearance of the object in a narrative experience and/or other information. The visual appearance may include one or more of color, shape, size, form, and/or other information. For example, one or more values of a visual appearance parameter of a first object may specify one or more of a form, a shape, a color, and/or other information related to appearance of the first object. By way of non-limiting illustration, a first object may include a weapon. One or more values of a visual appearance parameter may specify that the first object is formed to resembled a hand gun, is colored black, and/or other information related to appearance of the first object.

Values of an affordances parameter of an object may specify manners in which actors and/or objects may act upon the object. In some implementations, actors and/or objects may act upon other objects through one or more of passive actions, active actions, and/or other manners of interaction. For example, a first value of an affordances parameter of a first object may specify that actors and/or objects may act upon the first object in a first manner. By way of non-limiting illustration, one or more values of an affordances parameter of a chair object may specify that actors may "sit" upon the chair object. Further, values of an abilities parameter of a given actor may specify sequences of movement the actor may take in order to perform the action of sitting on the chair.

By way of further non-limiting illustration, one or more values of an affordances parameter of a weapon object may specify that actors may grasp the weapon in their hand. By way of non-limiting illustration, one or more values of an affordances parameter of a desk object (e.g., incorporated into an environment) may specify that actors may not manipulate the desk object in any manner (e.g., the desk may remain stationary).

Values of an abilities parameter of an object may specify actions and/or tasks the object may be configured to execute in a narrative experience and/or other information. An action and/or task of an object may be related to a form of the object (e.g., what the object "is"). By way of non-limiting example, a first value of an abilities parameter of a first object may specify that the first object may perform a first action within a narrative experience.

By way of non-limiting illustration, one or more values of an abilities parameter of a weapon object having a form of a gun may specify that the weapon object may shoot bullets and/or other objects when acted upon by an actor in a given manner. For example, one or more values of an abilities parameter of a given actor may specify sequences of movement the actor may take in order to perform actions of one or more of holding a gun object, aiming the gun object, and/or pulling a trigger of the gun object to cause the gun object to shoot bullets and/or other objects.

By way of non-limiting illustration, one or more values of an abilities parameter of a door object may specify that the door object may be opened and/or closed when acted upon by an actor in a given manner.

Values of a location parameter of an object may specify locations of an object, movements the object may perform throughout a narrative experience, and/or other information. By way of non-limiting example, one or more values of one or more location parameters may specify one or more of a starting location of an object at the start of a narrative experience, an ending location of the object at the end of the narrative experience, a current location of the object, sequences of movement the object may carry traverse from the first location to the second location, and/or other information. By way of non-limiting example, a first value of a location parameter of a first object may specify a first location of the first object at the start of a narrative experience.

Values of an environment parameter may specify an environment of a narrative experience. By way of non-limiting example, a first value of an environment parameter may specify a first environment. By way of non-limiting illustration, the first value may specify "bank" and/or other environment.

It is noted that the above descriptions of parameters are provided for illustrative purposes only and are not to be considered limiting. Values of parameters may include one or more of predetermined values, user-specified values, and/or other values determined by other techniques. In some implementations, values of parameters may change during a narrative experience. By way of non-limiting example, events that may take place within the narrative experience may cause the state of the narrative experience to change. By way of non-limiting example, an object and/or actor may be acted upon by one or more other objects and/or actors. In response to being acted upon, values of parameters of the object and/or actor may change.

By way of non-limiting illustration, an event may take place which may cause a location of an actor to change places. The value of a location parameter of the actor may change throughout the narrative experience. By way of further non-limiting illustration an event may take place which may cause an object included in an inventory of an actor to be taken away (e.g., an actor having a gun may have the gun taken from them). It is noted that the above descriptions of state of a narrative experience and/or how values of parameters may change are provided for illustrative purposes only and are not to be considered limiting.

User interface component 110 may be configured to effectuate presentation of a user interface on computing platforms associated with users of system 100. The user interface component 110 may be configured to obtain user input related to selection of one or more of event themes, events, animation components, and/or other information used for generating a narrative experience. A user interface may include one or more of one or more user interface elements, one or more display windows, one or more display elements, and/or other components. Individual user interface element may be selectable by a user. Individual ones of the user interface elements may represent one or more of events, animation components, and/or other components of a narrative experience that a user may select to generate a narrative experience.

By way of non-limiting illustration, a user interface element representing an event may include one or more of an icon, a check box, a drop down menu, and/or other representations within a user interface. An icon may include one or more of a graphical representation of an event, a description of an event, a name of an event and/or other information. A user interface element representing a narrative experience component may include one or more of an icon, a check box, a drop down menu, and/or other representations. By way of non-limiting example, a drop down menu may include a list of values of animation parameters that may be selected by a user to define a narrative experience component for a given event, other information.

In some implementations, a display window may be configured to display representations of one or more events that may have be selected by a user to generate a narrative experience that includes instances of the selected events.

In some implementations, a display window may provide an area of a user interface where user selections of user interface elements may be effectuated to generate a narrative experience. In some implementations, display area may include display elements that may guide a user to position selected events with respect to sequential occurrence, simultaneous occurrence, and/or other may facilitate other functions. By way of non-limiting example, display elements may include placeholders representing "slots" where individual events may be placed to establish a sequential/temporal position or order of selected events within a narrative experience.

By way of non-limiting example, user interface elements may be provided to the display window in accordance with one or more of a desired sequence of events, desired simultaneous occurrence of events, and/or may facilitate other functions to effectuate a user selection. By way of non-limiting example, individual user interface elements may be selectable by a user and provided within a display window to effectuate the selections via one or more of a drag-and-drop techniques, drop down menus, check boxes, and/or other techniques.

In some implementations, a user may provide input into a user interface of an event theme to populate a display window of the user interface with one or more events that may be selectable by the user.

In some implementations, user selection of a narrative experience component may include selections of values of one or more animation parameters of the narrative experience component used to define the narrative experience component. In some implementations, user selection of values of one or more animation parameters may be facilitate by one or more of a drop down menu, check boxes, and/or other techniques. By way of non-limiting illustration, second user interface 400 may include one or more of a first drop down menu 402 for selecting values of animation parameters of the first animation component, a second drop down menu 404 for selecting values of animation parameters of the second animation component, and/or other elements. It is noted that selections of animation components for other events may be facilitated in a same or similar manner as that described for the first event.

Returning to FIG. 1, storage component 21 may be configured to access and/or store electronic information, including but not limited to accessing and/or storing electronic information in the electronic storage. The electronic information may include narrative information. The narrative information may be used to specify narrative features of narrative content sets. Narrative content sets may form bases for narrative experiences to be generated in a virtual space and/or experienced by one or more users, e.g., in a virtual space. The narrative features may be associated with narrative feature types.

Virtual space component 22 may be configured to implement one or more instances of the virtual space executed by machine-readable instructions 106 to determine views of the virtual space. An instance of the virtual space may be based on and/or otherwise present a narrative experience to one or more users. In some implementations where the virtual space may be hosted by server(s) 118, the views may then be communicated (e.g., via streaming, via object/position data, and/or other information) from server(s) 118 to computing platforms 102 and/or 103 for presentation to users. The view determined and presented to a given user may correspond to a game entity being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may include a simulated space that is accessible by one or more users via computing platforms 102 and/or 103 that present the views of the virtual space to the one or more users. The instance executed by machine-readable instructions 106 may be synchronous, asynchronous, and/or semi-synchronous. The manner in which views of the virtual space are determined by virtual space component 22 is not intended to be limiting. Virtual space component 22 may be configured to express the virtual space in a more limited, or richer, manner.

Within the instance(s) of the virtual space executed by virtual space component 22, users may control game entities, objects, simulated physical phenomena, and/or other elements within the virtual space to interact with the virtual space and/or each other. The user-controlled elements controlled by and/or associated with a given user may be created and/or customized by the given user. The users may participate in the instance of the virtual space by controlling one or more of the available user controlled elements in the virtual space. Control may be exercised through control inputs and/or commands input by the users through computing platform(s) 102 and/or 103. User participation in the virtual space may include controlling game entities in the virtual space. A game entity may refer to a virtual object (or group of objects) present in the virtual space that represents an individual user.

Response component 23 may be configured to gather and/or aggregate user information that conveys user responses to narrative experiences by one or more users. In some implementations, user responses may be related to popularity, duration of time spent, virtual credit spent, credit spent, earnings by advertisers, and/or other measures of user engagement. In some implementations, user feedback from users may be used to determine user responses. In some implementations, selections made by users during engagement in the virtual space may be used to determine user responses For example, response component 23 may be configured to determine which particular narrative feature from a set of narrative features having the same or similar narrative feature type garnered the most favorable user response. For example, narrative experiences involving a particular mouse may be more popular than narrative experiences involving a particular duck. For example, narrative experiences involving a particular swamp environment may be more popular than narrative experiences involving a particular desert planet. For example, narrative experiences involving a particular ring may be more popular than narrative experiences involving a particular necklace. For example, narrative experiences involving a particular type of quest may be more popular than narrative experiences involving a particular type of chase. In some implementations, response component 23 may operate on combinations and/or sets of narrative features. More elaborate results regarding user responses may be determined, including, by way of non-limiting example, that narrative experiences involving a mouse losing a ring may be more popular than narrative experiences involving a duck buying a necklace, or that a combination of a dog chasing a treasure followed by the dog losing the treasure may be more popular than the combination of a dog losing a treasure followed by the dog chasing the treasure. In some implementations, the more elaborate results regarding user responses may be related to the types of narrative experience (e.g. a particular narrative content template) that garners a more favorable user response.

By way of non-limiting example, FIG. 2C illustrates examples of narrative content set templates. A template labeled "1" includes an ordered combination of three narrative feature types. A template labeled "i" is not further specified in this disclosure. As depicted in FIG. 2C, template "1" includes a combination of a "character type," an "action type," and an "object type." Based on the encoding provided in FIG. 2A, this template may be encoded and/or described as narrative information (e.g. to facilitate storage in electronic storage 119 and/or processing through machine-readable instructions by components of system 100). For example, as depicted, template "1" may be encoded with "[1,x]"+"[2,y]"+"[3,z]," wherein "x", "y", and "z" represent variables and/or numbers that are to be selected, e.g. by generation component 24. The templates in FIG. 2C are merely exemplary and not intended to be limiting in any way. In some implementations, system 100 may use a library of many different narrative content set templates, which may be mixed and/or combined to create additional templates and/or narrative content sets.

Referring to FIG. 1, generation component 24 may be configured to generate narrative content sets that form bases for narrative experiences. Alternatively, and/or simultaneously, generation component 24 may be configured to generate recommendations for narrative content sets. A narrative content set may include a set of narrative features. In some implementations, recommendations may be narrative content sets that are presented to one or more creative users by presentation component 25. In some implementations, recommendations may be information based on narrative content sets, with this information being presented to one or more creative users. For example, a recommendation may be a narrative content set including particular narrative features having one or more narrative feature types, such as "a mouse," "buys", and "a hat." Put together, this recommendation may be interpreted as "A mouse buys a hat." A recommendation may form the basis for a narrative experience. Operation of generation component 24 may be based on rules and/or guidelines regarding narrative features and/or narrative feature types that are likely to make sense and/or be compelling. For example, "a hat buys a mouse" or "a mouse buys a thief" may not be useful recommendations. Generation component 24 may be configured to use rules and/or guidelines regarding linguistic interpretation. By limiting certain combinations and/or preferring other combinations, the resulting recommendations may be more likely than random combinations to make sense and/or be compelling. In some implementations, feedback from creative users may add or alter the rules and/or guidelines used by generation component 24. For example, a creative user may, through feedback via a user interface, "teach" generation component 24 that "a thief" is not the type of object that may be bought, or that a hat is not the type of object that may make purchases. In some implementations, creative users may modify a recommendation. For example, a recommendation of "a hat buys a mouse" may be modified by a creative user to "a mouse buys a hat." Modifications, feedback and/or other actions from creative users may be used by generation component 24 to facilitate future generation of recommendations.

Generation by generation component 24 may be based on user information, in particular as aggregated by response component 23. One or more narrative experiences may be presented to and experienced by one or more users, e.g., in a virtual space. In some implementations, feedback and/or actions of an individual user in the virtual space may be used to determine the user information. For example, in a particular narrative experience, the individual user may be presented with multiple options, representing multiple sets of narrative content. Based on the selection by the individual user, the user information may reflect a preference for one of the multiple sets of narrative content. In some implementations, feedback and/or actions of multiple individual users in the virtual space may be used to determine the user information. For example, a first user may be presented with a first narrative experience, representing a first set of narrative content. A second user may be presented with a second narrative experience, representing a second set of narrative content. Based on the feedback and/or actions by the first and second user, the user information may reflect a preference for a particular set of narrative content and/or a particular narrative feature.

In some implementations, generation by generation component 24 may be based on narrative content set templates. By way of non-limiting example, FIG. 2D illustrates an example of generating multiple recommendations using narrative content set templates (labeled "set 1," "set 2," "set 3," and "set i"). Regarding the first generated recommendation, as depicted in FIG. 2D, narrative content set 1 is based on narrative content set template 1 of FIG. 2C. By selecting narrative features (from narrative feature type libraries as depicted in FIG. 2B) of the appropriate type as suggested by template "1" in FIG. 2C, the first generated recommendation is "A mouse buys a hat." FIG. 2D illustrates how this first generated recommendation may be encoded and/or described as narrative information (e.g. to facilitate storage in electronic storage 119 and/or processing through machine-readable instructions by components of system 100). For example, as depicted, the first generated recommendation may be encoded with "[1,1]"+"[2,1]"+"[3,1]." Regarding the second generated recommendation, as depicted in FIG. 2D, narrative content set 2 is based on narrative content set template 1 of FIG. 2C. By selecting narrative features (from narrative feature type libraries as depicted in FIG. 2B) of the appropriate type as suggested by the template in FIG. 2C, the second generated recommendation is "A soldier chases a thief." FIG. 2D illustrates how this second generated recommendation may be encoded and/or described as narrative information. For example, as depicted, the second generated recommendation may be encoded with "[1,2]"+"[2,2]"+"[3,2]."

Regarding the third generated recommendation, as depicted in FIG. 2D, narrative content set 3 is based on an ordered set of three narrative content sets, each of which is based on narrative content set template 1 of FIG. 2C. By selecting narrative features (from narrative feature type libraries as depicted in FIG. 2B) of the appropriate type as suggested by template "1" in FIG. 2C, the third generated recommendation is "A soldier buys a hat, a thief steals the hat, and the soldier chases the thief." FIG. 2D illustrates how this third generated recommendation may be encoded and/or described as narrative information. For example, as depicted, the third generated recommendation may be encoded with "[1,2]+[2,1]+[3,1]; [1,3]+[2,3]+[3,1]; [1,2]+

[2,2]+[1,3]." Note that in some implementations, the same object or character may be part of different narrative feature type libraries, as is depicted in FIG. 2B regarding "a thief." Regarding the generated recommendation labeled "narrative content set i," no further specification is provided in this disclosure. In some implementations, generation by generation component 24 may be based on other techniques than templates, including but not limited to algebraic techniques, machine-learning techniques, and/or combinations of different techniques.

Presentation component 25 may be configured to effectuate presentations of recommendations to creative users. In particular, presentation component 25 may be configured to effectuate presentations of recommendations via user interfaces on computing platforms 102 and/or 103. For example, recommendations and/or sets of narrative content may be presented to a creative user as text in a user interface. In some implementations, user interfaces may be configured to obtain user input from creative users, including but not limited to user input related to feedback from creative users, selection of one or more narrative features, and/or other information pertaining to recommendations and/or narrative experiences. In some implementations, presentation component 25 may be configured to effectuate presentations of more than one recommendation (e.g., two, three, four, or more recommendations) to a particular creative user, e.g. simultaneously. Selection, modifications, and/or other feedback from the particular creative user may be used as user information that is relevant to and/or used in future generation of recommendations.

In some implementations, user input from creative users may be used to determine the user information as input to response component 23. In some implementations, feedback from creative users may be referred to as creative feedback. In some implementations, feedback from interactive users in the virtual space may be referred to as user feedback.

Access component 26 may be configured to obtain information from the electronic storage. For example, the access component may be configured to obtain narrative information from the electronic storage. Obtained information may be used, e.g., by other components of the system, to facilitate the generation of recommendations. In some implementations, obtained information may be used to facilitate generation of (recommendations for) narrative content sets that form bases for narrative experiences.

Load component 27 may be configured to obtain implementations of narrative experiences suitable for presentation to users, e.g., in the virtual space. In some implementations, the load component may obtain implementations from the virtual space component. In some implementations, implementations of narrative experiences may be presented to users by virtual space component 21, presentation component 25, and/or other components of system 100.

The narrative experiences may be based on narrative content sets and/or recommendations for narrative content sets that form bases for narrative experiences. For example, load component 27 may be configured to obtain an implementation of a narrative experience that is based on a particular generated recommendation. For example, in view of FIG. 2D, the particular generated recommendation may be "A mouse buys a hat." A creator of narrative experiences may create an implementation of a narrative experience based on this particular recommendation. Load component 27 may be configured to obtain this implementation for presentation to one or more users.

The process of implementing narrative experiences for a particular virtual space may be outside the scope of this disclosure. Such a process may include manual steps, automated steps, and/or a mixture of both. In some cases, this process may be time-consuming, labor-intensive, and/or expensive.

Comparison component 28 may be configured to compare user information that conveys user responses to one or more narrative experiences. For example, the comparison component may be configured to compare two sets of user information conveying users responses to two narrative experiences, respectively. In some implementations, system 100 may be configured to present a reference narrative experience to one or more users. Comparison component 28 may be configured to compare user information related to the reference narrative experience with user information related to the narrative experience that is based on a particular generated recommendation. In some implementations, comparisons by comparison component 28 may be used in future generation of recommendations. In some implementations, operations by generation component 24 may be based, at least in part, on comparisons by comparison component 28.

In FIG. 1, server 118, computing platforms 102 and/or 103, and/or external resources 122 may be operatively linked via one or more electronic communication links. For example, such electronic communication links may be established, at least in part, via one or more networks 120 such as the Internet and/or other networks. It will be appreciated that this is not intended to be limiting and that the scope of this disclosure includes implementations in which components may be operatively linked via some other communication media.

External resources 122 may include sources of information, hosts, and/or providers of virtual spaces outside of system 100, external entities participating with system 100, external entities for player-to-player communications, and/or other resources. In some implementations, some or all of the functionality attributed herein to external resources 122 may be provided by resources included in system 100.

Servers 118 and/or computing platform 102 may include communication lines or ports to enable the exchange of information with a network and/or other computing platforms 103. Illustration of server 118 and/or computing platform 102 in FIG. 1 is not intended to be limiting. Server 118 and/or computing platform 102 may include a plurality of hardware, software, and/or firmware components operating together to provide the functionality attributed herein to server 118 and/or computing platform 102. For example, server 118 may be implemented by a cloud of computing platforms operating together as server 118.

Electronic storage 119 may include electronic storage media that electronically stores information. The electronic storage media of electronic storage 119 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor 104, information received from server 118, information received from computing platform 102, and/or other information that enables system 100 to function as described herein.

Processor(s) 104 may be configured to provide information-processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 21-28. Processor 104 may be configured to execute components 21-28 by software; hardware; firmware; some combination of software, hardware, and/or firmware; and/or other mechanisms for configuring processing capabilities on processor 104.

It should be appreciated that although components 21-28 are illustrated in FIG. 1 as being co-located within a single processing unit, in implementations in which processor 104 includes multiple processing units, one or more of components 21-28 may be located remotely from the other components. The description of the functionality provided by the different components 21-28 described above is for illustrative purposes and is not intended to be limiting, as any of components 21-28 may provide more or less functionality than is described. For example, one or more of components 21-28 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 21-28.

Figure 3:
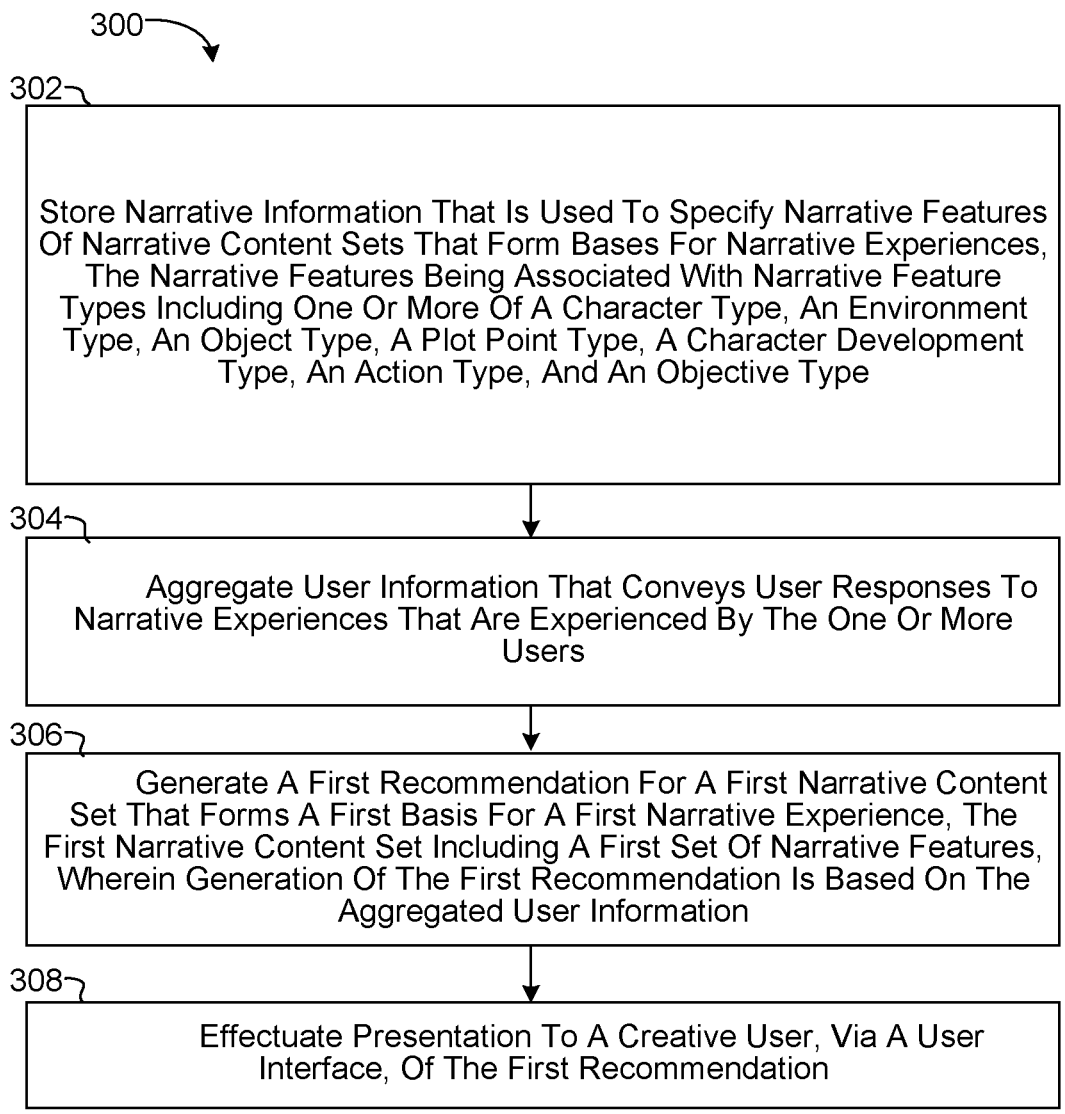
FIG. 3 illustrates a method for generating recommendations pertaining to narrative content to be experienced by one or more users in a virtual space, in accordance with one or more implementations.

FIG. 3 illustrates a method 300 for generating recommendations pertaining to narrative content to be experienced by one or more users, e.g., in a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 300 in response to instructions stored electronically on electronic storage media. The one or more processing devices may include one or more devices configured through hardware, firmware, and/or software to be specifically designed for execution of one or more of the operations of method 300.

At an operation 302, electronic information is stored. The electronic information includes narrative information that is used to specify narrative features of narrative content sets. The narrative content sets form bases for narrative experiences to be generated in a virtual space and/or experienced by one or more users, e.g., in a virtual space or other media, the narrative features being associated with narrative feature types including one or more of a character type, an environment type, an object type, a plot point type, a character development type, an action type, and an objective type. In some embodiments, operation 302 is performed by a storage component the same as or similar to storage component 21 (shown in FIG. 1 and described herein).

At an operation 304, user information is aggregated. The user information conveys user responses to narrative experiences. The narrative experiences may be generated in a virtual space. The narrative experience may be experienced in a virtual space or in other media by the one or more users. In some embodiments, operation 304 is performed by a response component the same as or similar to response component 23 (shown in FIG. 1 and described herein).

At an operation 306, a first recommendation is generated for a first narrative content set that forms a first basis for a first narrative experience, the first narrative content set including a first set of narrative features. Generation of the first recommendation is based on the aggregated user information. In some embodiments, operation 306 is performed by a generation component the same as or similar to generation component 24 (shown in FIG. 1 and described herein).

At an operation 308, a presentation is effectuate to a creative user, via a user interface, of the first recommendation. In some embodiments, operation 308 is performed by a presentation component the same as or similar to presentation component 25 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate recommendations pertaining to narrative content to be generated in a virtual space, the system comprising:

electronic storage configured to store electronic information, wherein the electronic information includes narrative information used to specify narrative features of individual narrative content, wherein combinations of the individual narrative content form narrative content sets, wherein the narrative content sets are experienced by users in the virtual space, wherein the narrative features are associated with narrative feature types including one or more of a character type, an environment type, an object type, a plot point type, a character development type, an action type, or an objective type, wherein the virtual space includes a three-dimensional topography and one or more virtual objects positioned within the three-dimensional topography that experience locomotion within the three-dimensional topography, and wherein the virtual space is presented to individual users on individual user interfaces displayed on individual computing platforms associated with the individual users, and wherein the individual users experience the narrative content sets by controlling individual virtual entities through the three-dimensional topography and/or interacting with the one or more virtual objects; and one or more physical processors configured by machine-readable instructions to:
  aggregate user information to generate aggregated user information, wherein the user information conveys prior user responses to the narrative content sets in the virtual space that have already been experienced by the users, such that the aggregated user information conveys an aggregate of the prior user responses;
  generate recommendations for future narrative content sets different from the narrative content sets that have already been experienced by the users, the recommendations being based on the aggregated user information for the users, such that a first recommendation is generated for a first narrative content set in the virtual space, the first narrative content set including a first set of narrative features, wherein the generation of the first recommendation is based on the aggregated user information for a first user and a second user, wherein the aggregated user information for the first user and the second user includes the aggregate of the prior user responses to the narrative content sets by the first user and the second user;
  effectuate presentation of the recommendations via a user interface through which a creative user provides feedback pertaining to the recommendations, wherein the creative user is different from the users who experience the narrative content sets, such that the first recommendation is presented via the user interface through which the creative user provides first feedback pertaining to the first recommendation, wherein the first feedback from the creative user includes one or more modifications to the first recommendation; and
  generate the future narrative content sets based on the recommendations and the feedback from the creative user, such that the first narrative content set is generated based on the first recommendation and the first feedback from the creative user including the one or more modifications to the first recommendation.

2. The system of claim 1, wherein the one or more physical processors are further configured to:
  obtain, from the electronic storage, the narrative information, wherein generation of the first recommendation is further based on the narrative information.

3. The system of claim 1, wherein the one or more physical processors are further configured to:
  obtain a first implementation of the first narrative content set suitable for presentation to the users in the virtual space; and
  effectuate presentation of the first narrative content set to the users in the virtual space.

4. The system of claim 3, wherein the one or more physical processors are further configured to:
  aggregate additional user information that conveys user responses to the first narrative content set by the users; and
  generate a second recommendation for a second narrative content set, the second narrative content set including a second set of narrative features, wherein generation of the second recommendation is based on the aggregate of the additional user information, and wherein the second set of narrative features is different from the first set of narrative features.

5. The system of claim 4, wherein the additional user information conveys time spent by the users engaging with the first implementation.

6. The system of claim 1, wherein the one or more physical processors are further configured to receive user input from the creative user, wherein the user input defines the first feedback pertaining to the first recommendation.

7. The system of claim 6, wherein the user input from the creative user includes a selection of the first recommendation from a set of recommendations.

8. The system of claim 6, wherein the user input from the creative user includes the one or more modifications to the first recommendation including a modification of the first set of narrative features.

9. The system of claim 1, wherein the one or more physical processors are further configured to:
  generate a second narrative content set based on the first recommendation and the first feedback from the creative user including the one or more modifications to the first recommendation, the second narrative content set including a second set of narrative features, wherein the second set of narrative features is different from the first set of narrative features.

10. The system of claim 1, wherein the prior user responses include user interactions between the users and the virtual space.

11. The system of claim 3, wherein the user information includes information that conveys user responses to the first narrative content set by the users, wherein the one or more physical processors are further configured to:
  obtain a reference implementation of a reference narrative content set suitable for presentation to the users in the virtual space;
  effectuate presentation of the reference implementation of the reference narrative content set to the users in the virtual space;
  aggregate reference user information that conveys user responses by the users to the reference narrative content set;
  compare the aggregate of the reference user information to the aggregated user information; and
  generate a second recommendation for a second narrative content set, the second narrative content set including a second set of narrative features, wherein the second recommendation is based on the comparison of the aggregate of the reference user information to the aggregated user information.

12. The system of claim 9, wherein the one or more physical processors are further configured to:
  effectuate presentation of the second narrative content set to users in the virtual space;
  aggregate additional user information that conveys user responses by the users to the second narrative content set,
  wherein the second recommendation is further based on the additional user information.

13. The system of claim 1, wherein the prior user responses convey virtual credit spent, credit spent, earnings by advertisers, or a combination thereof.

14. A method to generate recommendations pertaining to narrative content to be generated in a virtual space, the method being implemented in a computer system comprising one or more physical processors and electronic storage storing machine-readable instructions, the method comprising:
- storing electronic information, wherein the electronic information includes narrative information that is used to specify narrative features of individual narrative content, wherein combinations of the individual narrative content form narrative content sets, wherein the narrative content sets are experienced by users in the virtual space, wherein the narrative features are associated with narrative feature types including one or more of a character type, an environment type, an object type, a plot point type, a character development type, an action type, or an objective type, wherein the virtual space includes a three-dimensional topography and one or more virtual objects positioned within the three-dimensional topography that experience locomotion within the three-dimensional topography, and wherein the virtual space is presented to individual users on individual user interfaces displayed on individual computing platforms associated with the individual users, and wherein the individual users experience the narrative content sets by controlling individual virtual entities through the three-dimensional topography and/or interacting with the one or more virtual objects;
- aggregating user information to generate aggregated user information, wherein the user information conveys prior user responses to the narrative content sets in the virtual space that have already been experienced by the users, such that the aggregated user information conveys an aggregate of the prior user responses;
- generating recommendations for future narrative content sets different from the narrative content sets that have already been experienced by the users, the recommendations being based on the aggregated user information for the users, such that a first recommendation is generated for a first narrative content set in the virtual space, the first narrative content set including a first set of narrative features, wherein the generation of the first recommendation is based on the aggregated user information for a first user and a second user, wherein the aggregated user information for the first user and the second user includes the aggregate of the prior user responses to the narrative content sets by the first user and the second user; and
- effectuating presentation of the recommendations via a user interface through which a creative user provides feedback pertaining to the recommendations, wherein the creative user is different from the users who experience the narrative content sets, including presenting the first recommendation via the user interface through which the creative user provides first feedback pertaining to the first recommendation, wherein the first feedback from the creative user includes one or more modifications to the first recommendation; and
- generating the future narrative content sets based on the recommendations and the feedback from the creative user, including generating the first narrative content set based on the first recommendation and the feedback from the creative user including the one or more modifications to the first recommendation.

15. The method of claim 14, further comprising:
obtaining, from the electronic storage, the narrative information,
wherein generating the first recommendation is further based on the narrative information.

16. The method of claim 14, further comprising:
- obtaining a first implementation of the first narrative content set suitable for presentation to the users in the virtual space; and
- effectuating presentation of the first narrative content set to the users in the virtual space.

17. The method of claim 16, further comprising:
- aggregating additional user information that conveys user responses to the first narrative content set by the users; and
- generating a second recommendation for a second narrative content set, the second narrative content set including a second set of narrative features, wherein generation of the second recommendation is based on the aggregate of the additional user information, and wherein the second set of narrative features is different from the first set of narrative features.

18. The method of claim 17, wherein the additional user information conveys time spent by the users engaging with the first implementation.

19. The method of claim 14, further comprising:
receiving user input from the creative user, wherein the user input defines the first feedback pertaining to the first recommendation.

20. The method of claim 19, wherein the user input from the creative user includes a selection of the first recommendation from a set of recommendations.

21. The method of claim 19, wherein the user input from the creative user includes the one or more modifications to the first recommendation including a modification of the first set of narrative features.

22. The method of claim 19, further comprising:
generating a second narrative content set based on the first recommendation and the first feedback from the creative user including the one or more modifications to the first recommendation, the second narrative content set including a second set of narrative features, wherein the second set of narrative features is different from the first set of narrative features.

23. The method of claim 14, wherein the prior user responses include user interactions between the users and the virtual space.

24. The method of claim 16, wherein the user information includes information that conveys user responses to the first narrative content set by the users, wherein the method further comprises:
- obtaining a reference implementation of a reference narrative content set suitable for presentation to the users in the virtual space;
- effectuating presentation of the reference implementation of the reference narrative content set to the users in the virtual space;
- aggregating reference user information that conveys user responses by the users to the reference narrative content set;
- comparing the aggregate of the reference user information to the aggregated user information; and
- generating a second recommendation for a second narrative content set, the second narrative content set including a second set of narrative features, wherein the second recommendation is based on the comparison of the aggregate of the reference user information to the aggregated user information.

25. The method of claim 22, further comprising:
effectuating presentation of the second narrative content set to users in the virtual space;

aggregating additional user information that conveys user responses by the users to the second narrative content set, wherein the second recommendation is further based on the aggregate of the additional user information.

26. The method of claim 14, wherein the prior user responses convey virtual credit spent, earnings by advertisers, or a combination thereof.

\* \* \* \* \*